Feb. 12, 1935.  J. E. TOWNER  1,991,184
AIR SHOCK AND VIBRATION ABSORBER
Filed Nov. 3, 1932  3 Sheets-Sheet 1
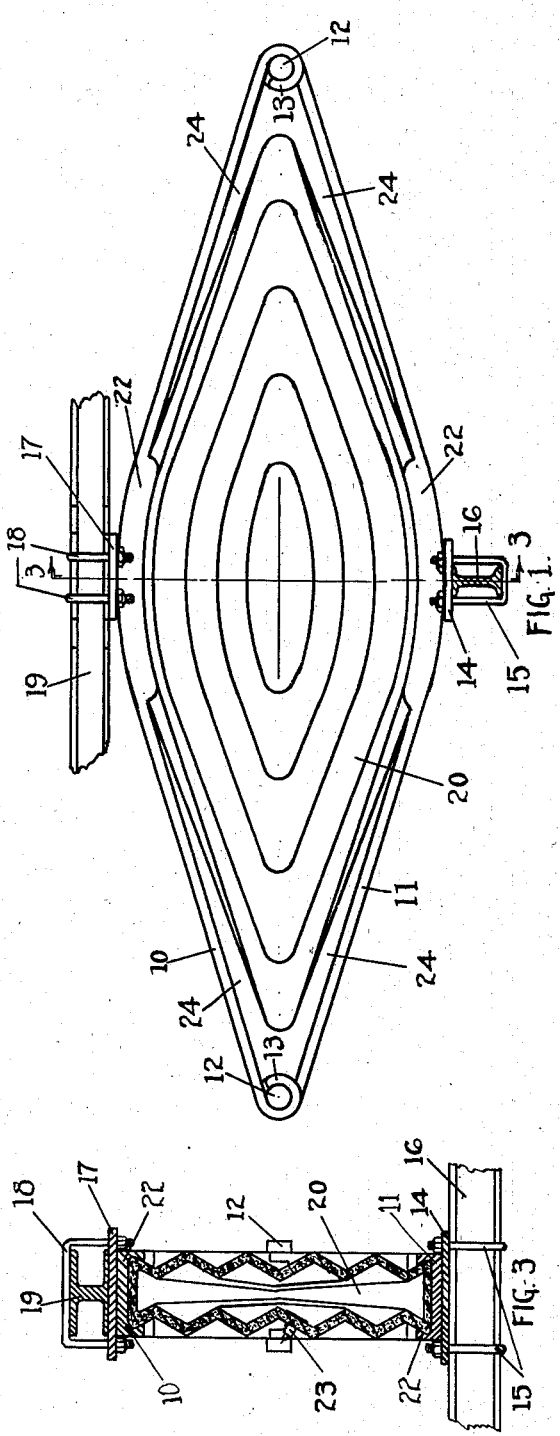
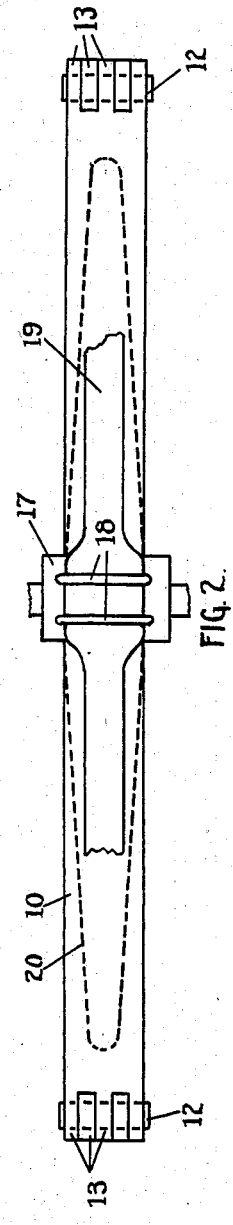
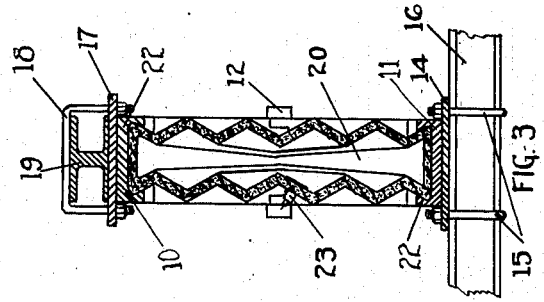
INVENTOR.
JOHN E. TOWNER
BY
ATTORNEY

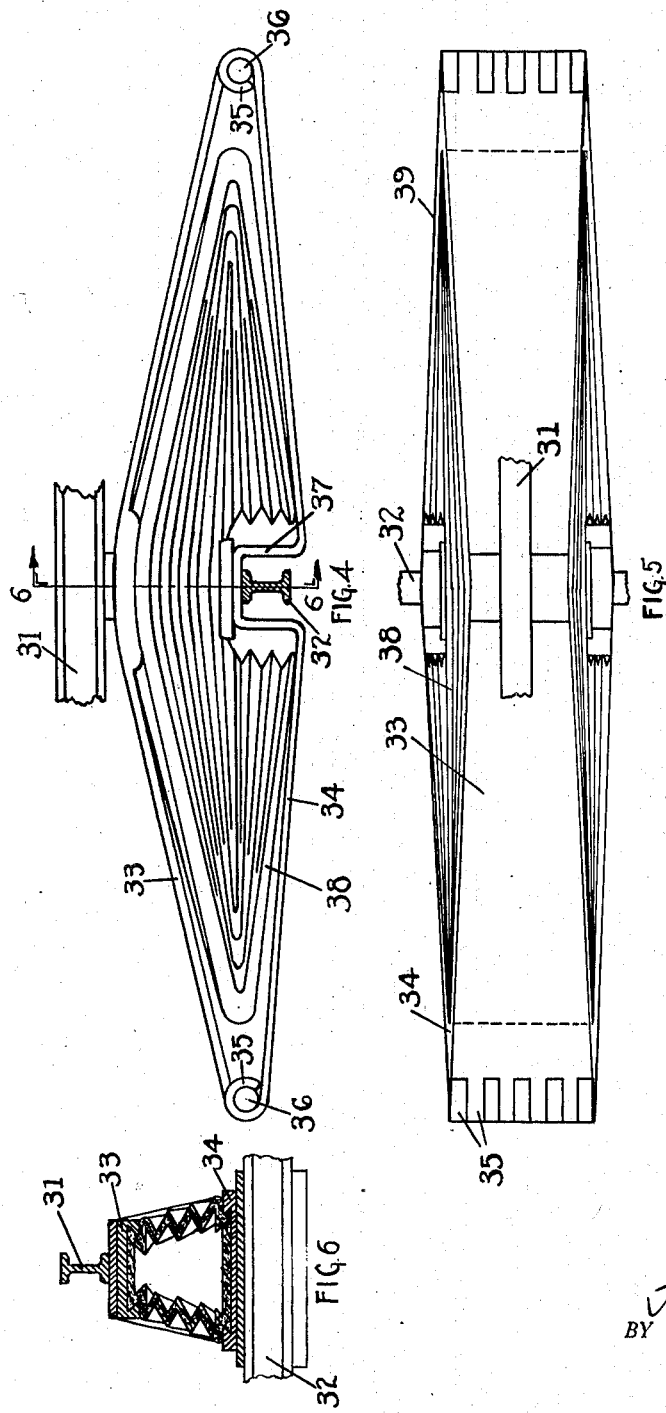

Feb. 12, 1935. J. E. TOWNER 1,991,184
AIR SHOCK AND VIBRATION ABSORBER
Filed Nov. 3, 1932   3 Sheets-Sheet 3
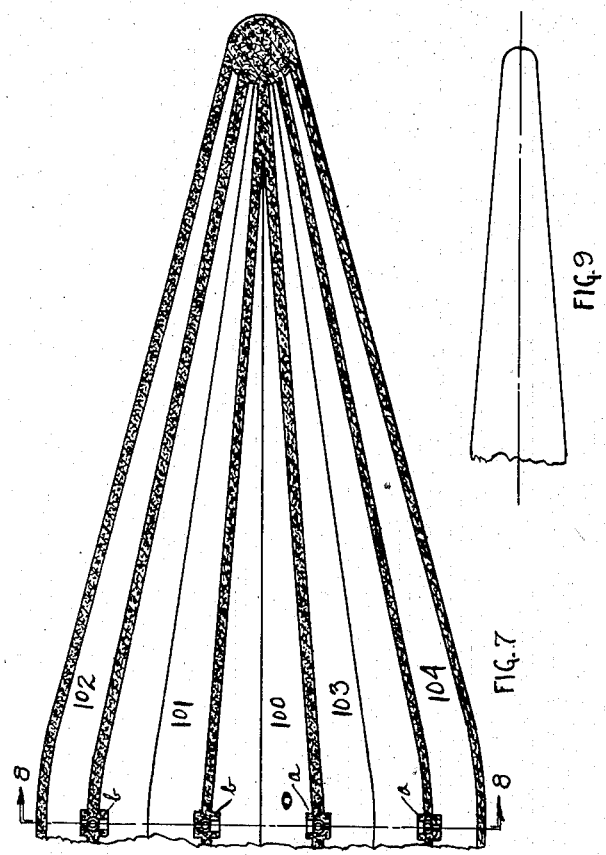
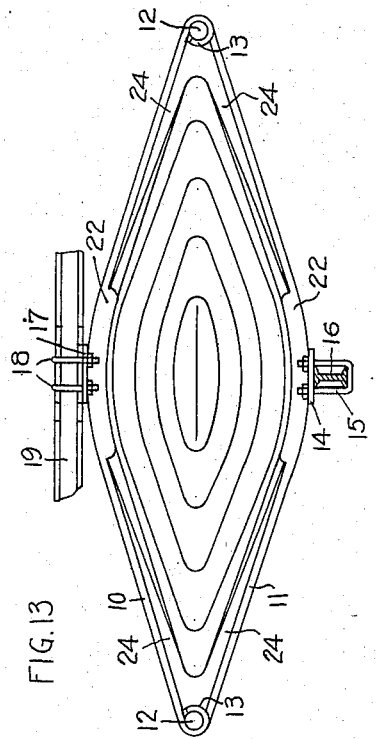
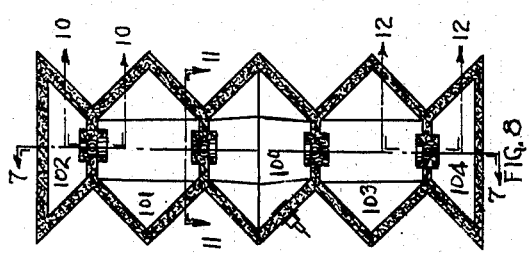
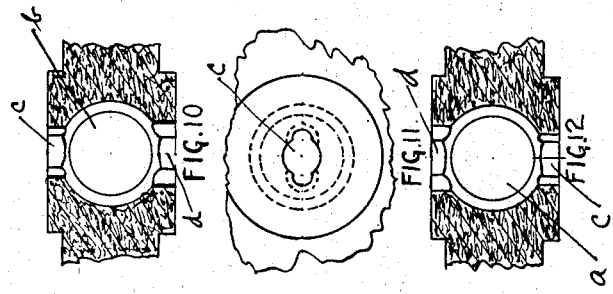
INVENTOR.
JOHN E. TOWNER
BY
ATTORNEY

UNITED STATES PATENT OFFICE 1,991,184

AIR SHOCK AND VIBRATION ABSORBER

John E. Towner, New York, N. Y.

Application November 3, 1932, Serial No. 641,010

5 Claims. (Cl. 267—31)

This invention relates to new and useful improvements in an air spring and air cushion fastening or an air shock and vibration absorber for the purpose of eliminating shock and vibration in any and all devices adapted for its reception or use, and also provides for the gradual or slow return to normal shape of the air cushion after a shock has been administered.

It is particularly proposed to provide a resilient arrangement depending for its resiliency upon compressed gas, or air which necessarily is more elastic than material having molecules that are more closely adhered. The arrangement will be more efficient for absorbing shock and vibration than a steel spring or solid rubber fastening and will eliminate vibration to a degree never before attained by any method. It may also be used where the thrust is to be taken from all directions and in this case it will be used as an air cushion between the solid members and the fastened members.

The idea simply consists of placing a resilient container charged with compressed gas of the proper pressure and having sides of accordion shape or form or other similar form designed to expand and contract in the proper direction and itself being of sufficiently stiff, resilient material, or supported by virtue of its design, shape or form or by other means such as internal or external or integral supports to substantially maintain its shape under the loads and the said air or gas pressure, between the fastening member and the fastened member for making this resilient air filled container shock absorbing or dissipating.

There are several ways of doing this which will be explained in detail with respect to the various figures of the drawings, and can be divided up into three general divisions:

(a) First, a fastening which takes thrust in one or more directions through solid fastening or fastenings but can be arranged to take other thrusts in said or other directions through the medium of the air cushion.

(b) Second, those in which the fastenings and air cushions are designed so that the cushion or cushions will take all the thrust that may arise from the planned directions, that is, the resilient material of the cushion proper will act the same as solid fastenings as described in (a) above. Thrust will be taken care of by design or form or shape or material of cushion proper.

(c) Third, by making one of the members of the pair (held and holding) shock resisting or absorbing at the point of contact; that is, the member itself is a container holding compressed air or gas which acts the same as the air cushion in (a) or (b) above. Also both members could be containers of compressed air or gas.

It also provides a means for returning the air container to its original shape or form after the shock or pressure has been administered, and has been released, by simply allowing the air which is under high pressure at the administration of a shock to slowly return to equilibrium within several different compartments of which a container can be made up of, or by having each successive compartment starting from point of shock receipt of increasingly higher or lower gas pressure; thus absorbing the shock by increments which are in proportion to the size of the shock and returning the container to original shape in proportion to the increments or decrements of pressure in the different compartments and to the load sustained. The air cushion itself maintains its designed form for which it is to be used in four different ways, any of which can be used singly or in a combination with another or others. They are:

(A) First.—By virtue of its construction, shape, design, form or material—either, any or all of these.

(B) Second.—By means of support on the outside of the container which is not a part of the container itself.

(C) Third.—By means of support on the inside of the container which is not a part of the container proper.

(D) Fourth.—By means of support built in or integral with the material of the air container proper.

(E) Any, either or all of these above combined or used singly in any way necessary to the construction or use to which the air container is to be put.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is a side elevational view of a steel spring equipped with an air spring (so named, but it is an air cushion fastening) according to this invention.

Fig. 2 is a plan or top view of Fig. 1.

Fig. 3 is a sectional view taken along the line 3—3 of Fig. 1.

Fig. 4 is a side elevational view of another type of steel spring equipped with an air spring according to this invention.

Fig. 5 is a plan or top view of Fig. 4.

Fig. 6 is a sectional view taken on the line 6—6 of Fig. 4.

Fig. 7 is a fragmentary view of a portion of a resilient air container for use in the air spring and air cushion fastening according to a further modified form of this invention.

Fig. 8 is a sectional view looking in the direction of the line 8—8 of Fig. 7.

Fig. 9 is a fragmentary plan or top view of either Fig. 7 or 13 reduced.

Fig. 10 is a fragmentary portion of the section taken along line 10—10 of Fig. 8.

Fig. 11 is a fragmentary portion of the section taken along line 11—11 of Fig. 8.

Fig. 12 is a fragmentary portion of the section taken along line 12—12 of Fig. 8.

Note:—Figs. 7 to 12 are drawn to show what can be done to make this device self snubbing besides being a shock absorbing member. Also notice that its construction or form or shape is only one more of the many different ways in which this idea is incorporated. Namely that of making the sides of the container in such a way that they will give readily in the direction necessary for supporting, absorbing and transmitting the thrust to or on the air rather than to or on the material of the container.

Fig. 13 is a view similar to Fig. 1 but showing the casing of Fig. 7 substituted for the casing in Fig. 1. In the form of the invention illustrated in Figs. 1–3 a steel spring has been shown which comprises an upper leaf 10 and a lower leaf 11 arched away from each other. The ends of these leaves are hingedly connected by reason of pins 12 at the ends, around which the ends of the leaves are engaged. Said ends being formed with interengaging fingers 13 to accomplish the pivotal connection. The lower leaf 11 has a plate 14 secured at its center by welding or any other arrangement, and U-shaped bolts 15 connect the plate 14 with a support member 16. A plate 17 is welded or in any other manner secured upon the top central portion of the leaf 10. U-shaped bolts 18 connect the plate 17 with a supported member 19. The construction thus far described constitutes a "solid" connection between the supported and the supporting member which will take all the thrust horizontally and vertically. In the vertical direction the solid connection will also absorb vibration and act as a cushion.

My invention proposes an arrangement in conjunction with said solid connection thus far described for producing an air spring and air cushion fastening in addition to the solid connection. This air spring and air cushion fastening may be so constructed as to cause the entire structure to have greater shock absorbing qualities than merely the steel spring or solid rubber fastenings known at the present time and will eliminate vibration to a point never before attained by any method. More particularly a container 20 charged with compressed air or gas is interposed between the leaves 10 and 11. This container 20 is made or constructed of resilient, sufficiently stiff, gas impenetrable material required for use and designed or shaped to substantially maintain its shape and size under the load and under the pressure of the compressed gas or supported thereto. This material may be a combination of rubber and webbing combined, similar to the shoe of a tire, or it may be of metal or any other suitable material. The opposite sides of said container 20 which are disposed in the direction of thrust, that is, the vertical direction, are constructed of accordion forms to "give" in said direction for transferring shock and vibration to said compressed gas. Any particular type of gas may be used including air.

The container 20 may be secured upon the leaves 10 and 11 in various ways, but a preferred construction comprises a pair of flanges 22 upon the edges of the leaves 10 and 11 in the vicinity of the center or in the center part and having their inner faces of dovetail construction or form, see Fig. 3, so that the edges of the container 20 may be forced therein maintaining its position in the same manner as the shoe of a tire maintains its position upon the felloe of a wheel. The container 20 may be charged with the gas by reason of the provision of a valve 23 mounted upon the side of the container. The container 20 is so constructed so as to more efficiently transfer the shock and vibrations to the enclosed gas. As shown in detail in Fig. 1, the center portion of the container 20 at the top and at the bottom is secured upon the leaves 10 and 11 while the ends taper away from the leaves leaving spaces 24 between the edges of the container and the inner faces of the leaves.

The accordion construction of the sides of the container give it the quality of readily "giving" in the vertical direction and simultaneously giving rigidity to the sides of the container for aiding in maintaining its shape. Furthermore the right and left hand ends of the container 20 preferably should be reduced as indicated by the dotted lines in Fig. 2. A feature of the spaces 24 lies in the fact that there will be a material reduction of friction between the container 20 and the inner faces of the leaves 10 and 11 during transmission of shock and vibration. Also the small space of contact between the load and the air cushion will allow quick and self adjustment of adequate alignment between these members of the apparatus. The flexibility of the container combined with greater mobility of air molecules within it will absorb shock and vibration more effectively than would be if transmitted through solid molecules of a simple solid attachment or any kind of spring absorber. It is very important that the container 20 be constructed of the proper stiffness or designed, formed or supported so as to substantially maintain its shape and size. The material as before stated may be a rubber combination with web or flexible steel or any combination of suitable material. The object of this construction is that the compressed air within it will not be capable of materially bulging the sides so as to transform it beyond its reasonable confines.

At the instance of shock or pressure ridges formed by the continuation of the apexes of the V's and the edges of the V's will not bulge out because they are supported by the V construction. The load of upper member on the lower member will keep the angle of these V's within two values which will be adequate to maintain the edges formed by the continuation of apexes of the V's from bowing or bulging. In this way the design itself is self supporting or preventative of bulging. Also notice that the edges of container 20 converge (shown by dotted lines in Fig. 2) thus giving added strength. I have tried to explain this simple conception also in Fig. 4. That is that the apexes of the V's will not normally get out of their original form, that the requirements of the gas for more or less room will be taken care of by the bulging of the sides of the V's which are much thinner than the apexes. Thus the requirements can be designed for by increasing or decreasing the number of sides of the V's. Thus the accordion sides are maintained in shape for the purposes desired.

In Figs. 4-6 inclusive another variation of the invention has been disclosed which is very similar to the form illustrated in Figs. 1-3 inclusive. An important distinction of this form lies in the construction of the resilient container which is substantially of trapezoidal form in transverse cross section. More particularly reference numeral 31 indicates a fastened member, and 32 the fastening member. Steel springs are connected between these members and comprise an upper leaf 33 and a lower leaf 34 substantially bowed away from each other. The ends of these leaves hingedly connect by reason of finger portions 35 formed on the ends and bend around pins 36. The leaf 34 has its bottom center portion formed with an upwardly bent section 37 so that the fastened member 32 may be snugly engaged therein. The top leaf 33 is of smaller width at its center than the bottom leaf, very plainly shown in Fig. 5.

Interposed between the leaves 33 and 34, there is a container 38 with a valve 39 in its side so that it may be charged with compressed gas. This container is constructed of resilient material sufficiently stiff to substantially maintain its shape and size under the load of the members and the compressed air. (Note that shape, form and design have a great deal to do with the container maintaining its normal shape under above conditions as explained previously.) This container is substantially of trapezoidal shape in transverse cross section which may be readily seen from inspecting Figs. 5 and 6. The inclined sides of this container are of accordion form, shown in Fig. 6, so as to "give" in the vertical direction for transferring shock and vibration to the compressed gas. The trapezoidal shape forms a construction which resists to a lessened degree the transferring of the shock and vibrations to the compressed air or gas. This may be seen by considering Fig. 6 and understanding that the accordion bends not being directly over each other may be more readily compressed since lesser resistance is offered and still maintain the main outline of the container because of the stronger less flexible apex of V's as compared to the sides of the V's which take the requirements of the gas for more or less space.

Figs. 1-6 inclusive show how this device can be constructed such that the forces from the held member to the holding member of the structure are transmitted inflexibly in some directions by the solid connection while the forces in the remaining direction will be absorbed flexibly by the air or gas and its container in such a way that sudden forces in these latter directions will be transmitted from the held member to the holding member or vice versa, gradually and without shock or vibration. The figures show where metal is used to transmit forces inflexibly while the flexible air or gas container is used to transmit the remaining forces gradually.

In Figs. 7 to 13 inclusive a modified form of the device has been disclosed in which provision has been made for making these shock absorber cushions self-snubbing; that is, after the cushion has been compressed by a heavy load or after it has absorbed a shock by getting smaller in volume and raising the pressure of the gas within it, it will be able to return to normal size and shape as rapidly or as slowly as desired for the best interest of the use to which it is being put. More particularly Fig. 7 shows a fragmentary cross-section of a container similar to that shown in Fig. 1. The container is divided into several compartments 100, 101, 102, 103 and 104, preferably bounded by the outlines of the accordion shapes. Each compartment has a passage for air to its adjacent compartment through the valves either $a$ or $b$. These valves are shown more clearly in Figs. 10, 11 and 12 and are designed such that they will allow air to pass rapidly in one direction and less rapidly in the other direction. Valve $a$ is represented by Fig. 12 and valve $b$ is represented by Fig. 10. Valve $a$ is valve $b$ turned upside down. These valves which are made integral with the container are formed by simple annular cavities inclosing a ball of proper material and of smaller diameter than the annular cavities. Fig. 11 shows a general plan view of these valves $a$ and $b$.

The valve has passages $c$ and $d$ from the annular cavity to each of the two compartments of the casing that the valve is serving of the same cross-sectional area through which the ball cannot pass. On opposite sides of passages $c$ and $d$ there are two or more supplementary passageways, those supplementary to $c$ smaller than those supplementary to $d$. The action of the ball at the passage of air through the valve will be to center itself over the passage either $c$ or $d$ according to the direction in which the air is flowing, leaving the opening over the supplementary passages free due to the eccentricity of the smaller diameter of the ball as compared to the diameter of the cavity. The opposite passage $c$ or $d$ will be entirely open along with its supplementary passages. The difference in cross-sectional area of the two sets of supplementary passages will allow the air to pass more quickly in one direction than it will in the other.

The $a$ valves allow the air to pass quickly from 104 to 105 to 100 and the $b$ valves allow the air to pass quickly from 102 to 101 to 100 at the instance of shock or pressure administered in a vertical direction (Fig. 7). In other words, the air in all the chambers becomes quickly equalized thus dissipating the shock equally and quickly distributing the air among all the chambers. But at the instant of withdrawal of shock or pressure, the pressure of air in outer chambers 102 and 104 becomes less than that in 101, 103 and 100, and the air in 101 escapes through the valve $b$ to 102 and air in 103 escapes to 104 through valve $a$ but since the holes for this passage of air are smaller than those for passage of air in the other direction, the air in 103 will slowly equalize in pressure with the air in 104 while the same thing is going on between 102 and 101. In turn 100 will equalize its pressure with 101 and 103. This will make a very effective rebound or snubbing feature of the air shock absorber and since no shock absorber is complete unless it can dissipate a shock without otherwise forming a shocking administerer in itself, I claim this feature as being fundamental to the success of the operation and use of this invention.

Other forms of valves can be used. This one has been designed especially for this use and I claim it for this use and any other use to which it may be put. Fig. 9 is a fragmentary plan view of either Figs. 7 or 13. Note also that two or more compartments can be used for this and that the valves can be reversed, that is, the air can be made to operate in the reverse direction, and the air can also move from the top compartment consecutively to the final bottom compartment or vice versa. However symmetrical action around the horizontal center line is preferable, because of its equalizing action. I wish to claim this form of valve for any use to which it may be put, since it might be used in or as a feature of a device using liquid or other flowing substance that is required to flow rapidly in one direction and less rapidly in the reverse direction. It is not a check valve.

In Fig. 13 the casing illustrated in Fig. 7 is shown engaged in the leaves of the spring illustrated in Fig. 1. The details of the leaves may be recognized by the same reference numerals.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit or the scope of the appended claims.

Having thus described my invention, what I claim as new, and desire to secure by United States Letters Patent is:—

1. An air spring and air cushion fastening, comprising a steel spring composed of upper and lower leaves bent away from each other and hingedly connected at the ends for pivoting in the vertical and each having a pair of edge flanges extended towards each other, and a container charged with compressed gas interposed between said leaves and constructed of resilient material sufficiently stiff to substantially maintain its shape and size under loads transferred to said leaves and container and under the load of the compressed gas, and having its sides which are disposed in the direction of thrust of said leaves of substantially accordion form to "give" in said direction for transferring shock and vibration to said compressed gas and having upper and lower portions engaging between said flanges for holding said container in position.

2. An air spring and air cushion fastening, comprising a steel spring composed of upper and lower leaves bent away from each other and hingedly connected at the ends for pivoting in the vertical and each having a pair of edge flanges extended towards each other, and a container charged with compressed gas interposed between said leaves and constructed of resilient material sufficiently stiff to substantially maintain its shape and size under loads transferred to said leaves and container and under the load of the compressed gas, and having its sides which are disposed in the direction of thrust of said leaves of substantially accordion form to "give" in said direction for transferring shock and vibration to said compressed gas, said container being shaped so as to contact with said leaves at the top and bottom only, and said contacting portions engaging between said flanges for holding said container in position.

3. An air spring and air cushion fastening comprising a member formed as a container charged with compressed air and constructed of resilient material sufficiently stiff to substantially maintain its shape and size under the load and under the said compressed gas and having its sides of accordion form to "give" for transferring shock and vibration to said compressed gas, said container being divided with a plurality of partitions into compartments, and valves upon said partitions adapted to control the flow between the compartments at controlled different speeds in opposite directions for obtaining snubbing.

4. An air spring and air cushion fastening, comprising a steel spring composed of upper and lower leaves bent away from each other and hingedly connected at the ends for pivoting in the vertical and each having a pair of edge flanges extended towards each other, and a container charged with compressed gas interposed between said leaves and constructed of resilient material sufficiently stiff to substantially maintain its shape and size under loads transferred to said leaves and container and under the load of the compressed gas, and having its sides which are disposed in the direction of thrust of said leaves of substantially accordion form to "give" in said direction for transferring shock and vibration to said compressed gas, said container being shaped so as to contact with said leaves at the top and bottom only, and said contacting portions engaging between said flanges for holding said container in position, said contacting portions and the inner faces of each of said pair of flanges being of dove-tailed form.

5. An air spring and air cushion fastening, comprising a steel spring composed of upper and lower leaves bent away from each other and hingedly connected at the ends for pivoting in the vertical, and a container charged with compressed gas interposed between said leaves and constructed of resilient material sufficiently stiff to substantially maintain its shape and size under loads transferred to said leaves and container and under the load of the compressed gas, and having its sides which are disposed in the direction of thrust of said leaves of substantially accordion form to "give" in said direction for transferring shock and vibration to said compressed gas, horizontal partitions dividing said container into several compartments, and valves upon said partitions adapted to control the flow between the compartments at controlled different speeds in opposite directions for obtaining snubbing.

JOHN E. TOWNER.